Figure 7:
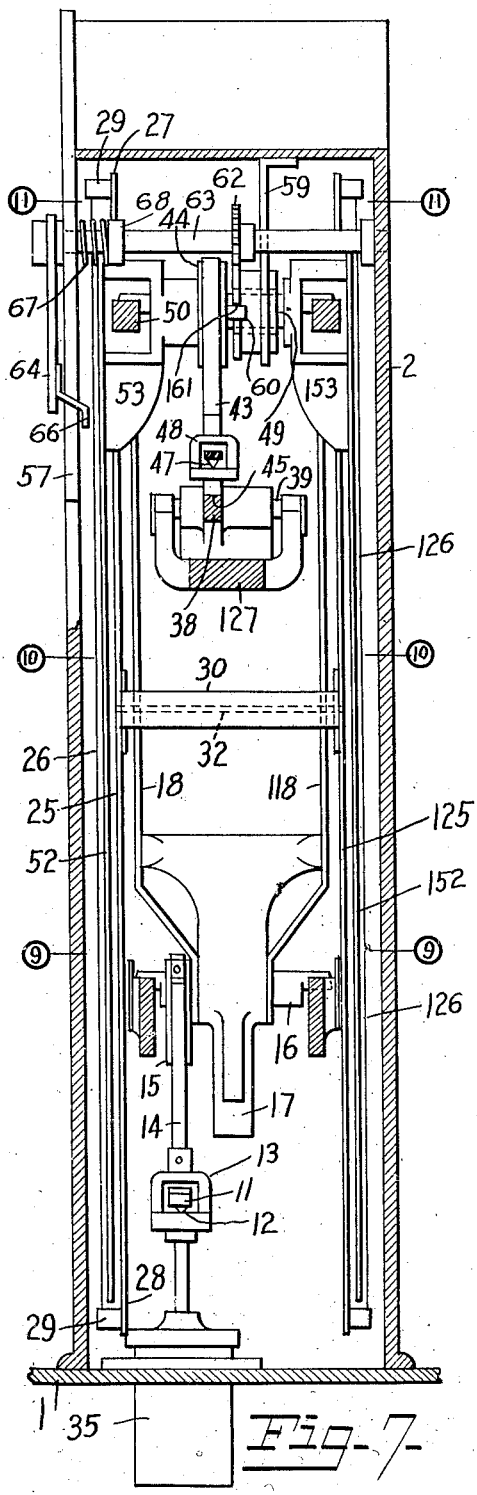

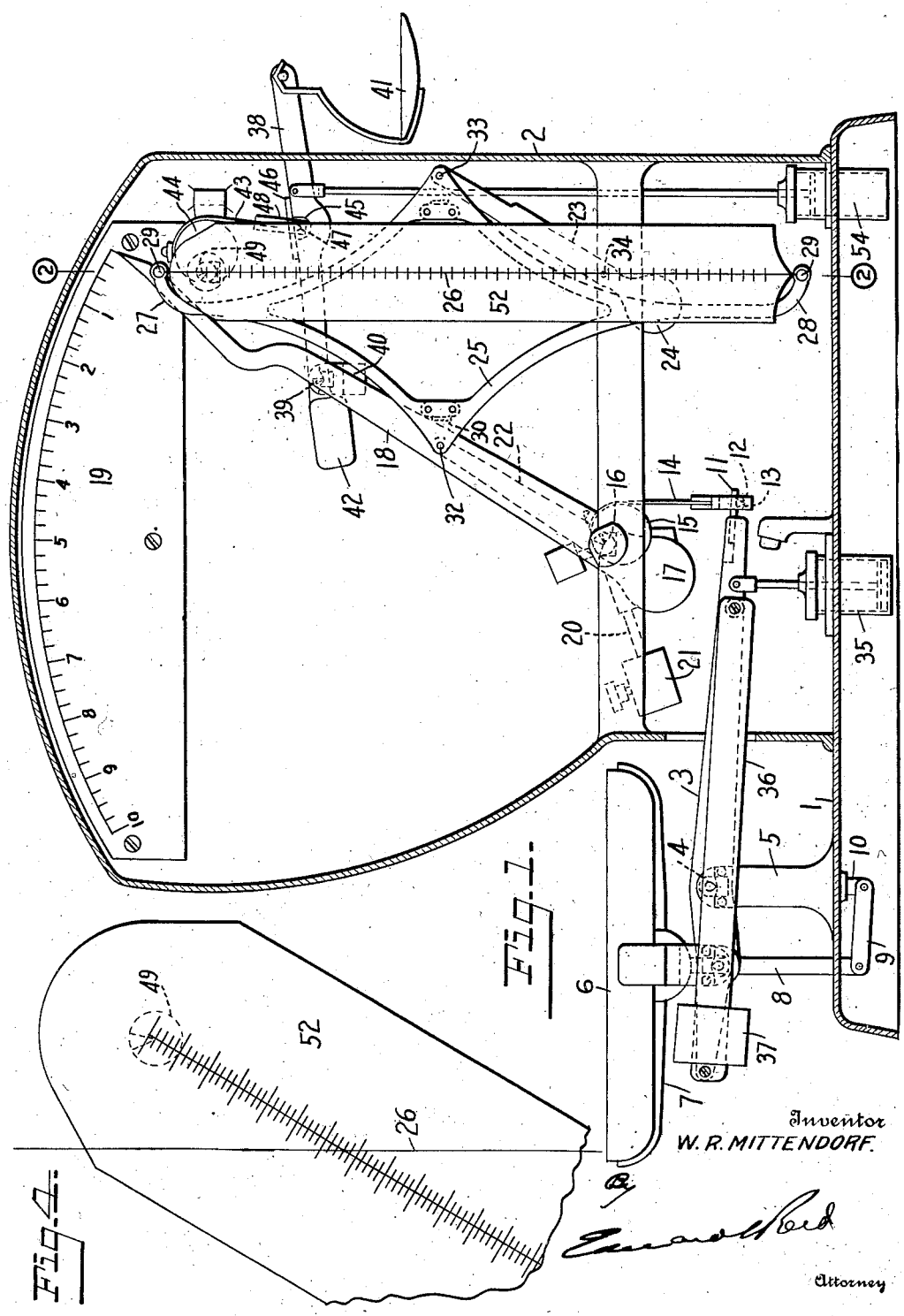

Nov. 22, 1927.

W. R. MITTENDORF 1,650,224

COMPUTING SCALE

Filed Sept. 23, 1922

7 Sheets-Sheet 2

Inventor
W. R. MITTENDORF.

By [signature]

Attorney

Nov. 22, 1927.
W. R. MITTENDORF
COMPUTING SCALE
Filed Sept. 23, 1922
1,650,224
7 Sheets-Sheet 3
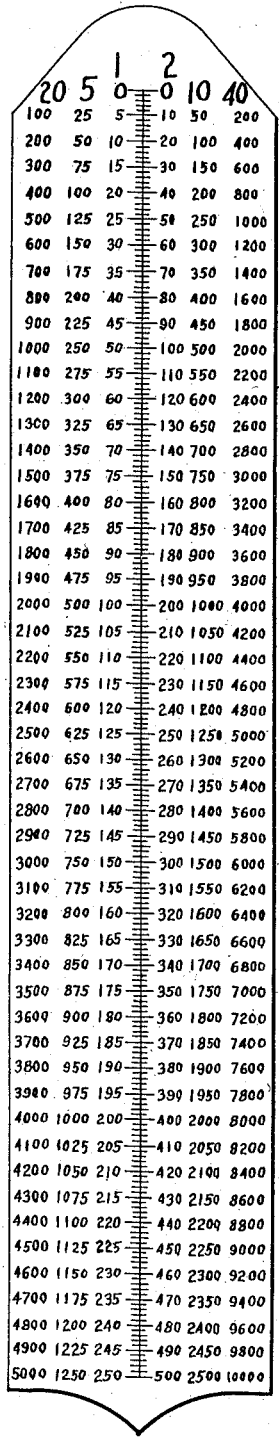
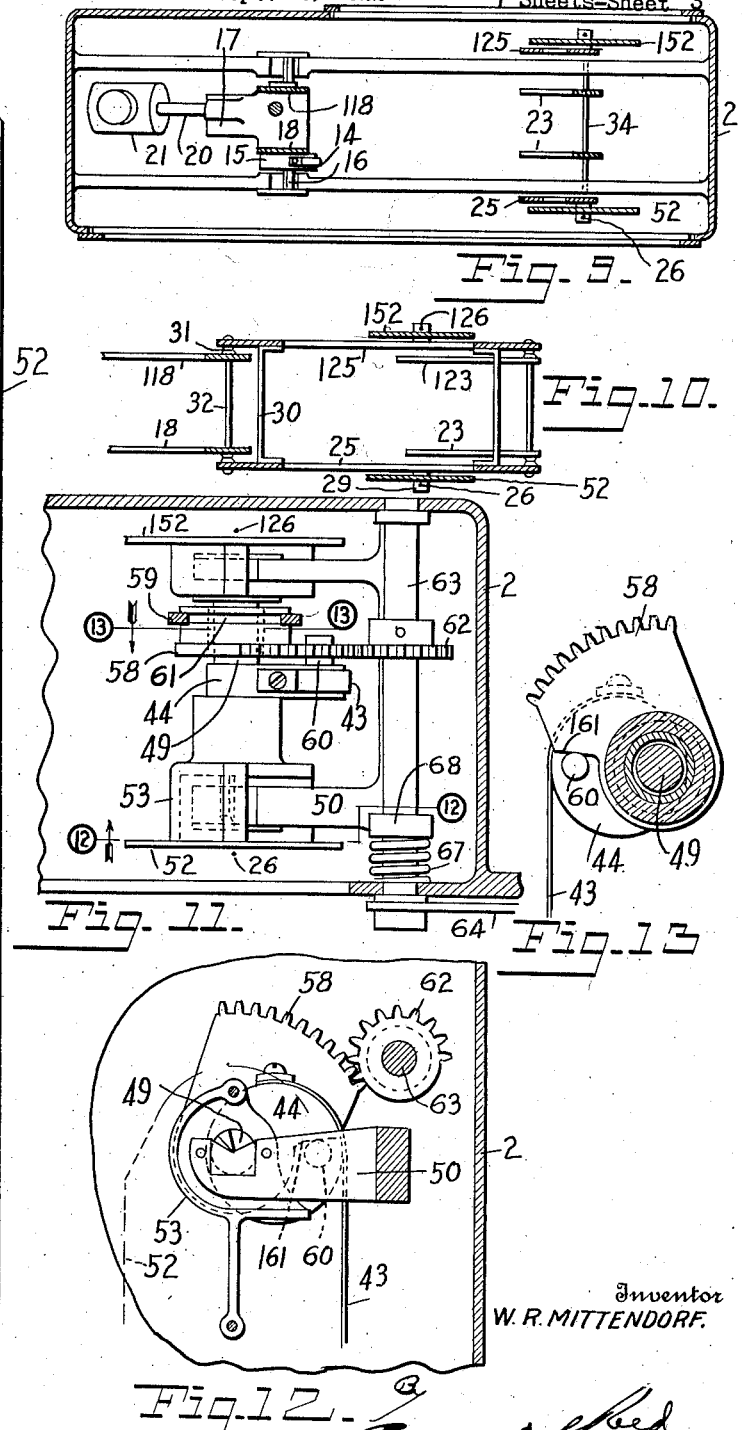
Inventor
W. R. MITTENDORF.
Attorney Nov. 22, 1927.
W. R. MITTENDORF
1,650,224
COMPUTING SCALE.
Filed Sept. 23, 1922
7 Sheets-Sheet 4
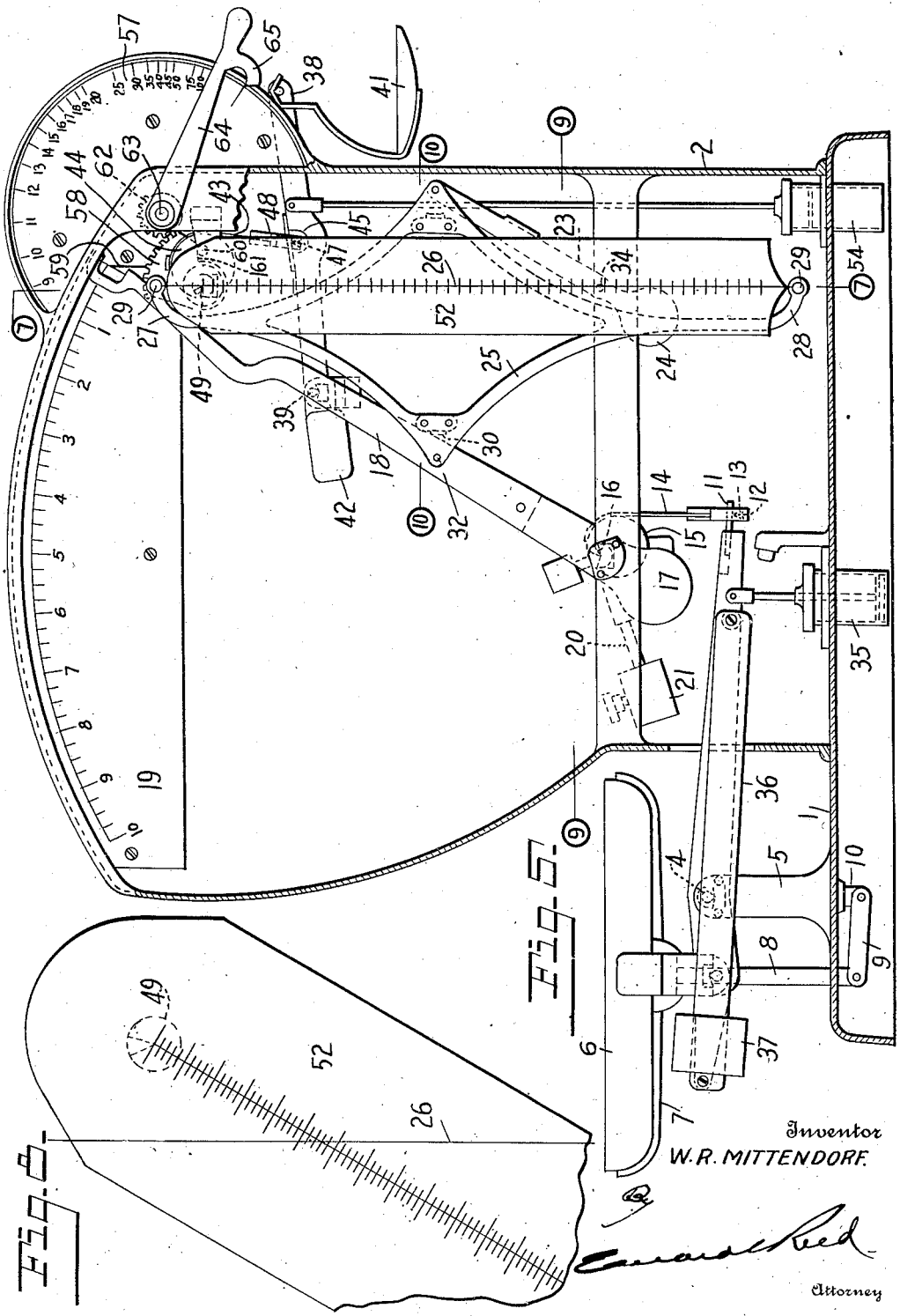
Inventor
W. R. MITTENDORF.
Attorney

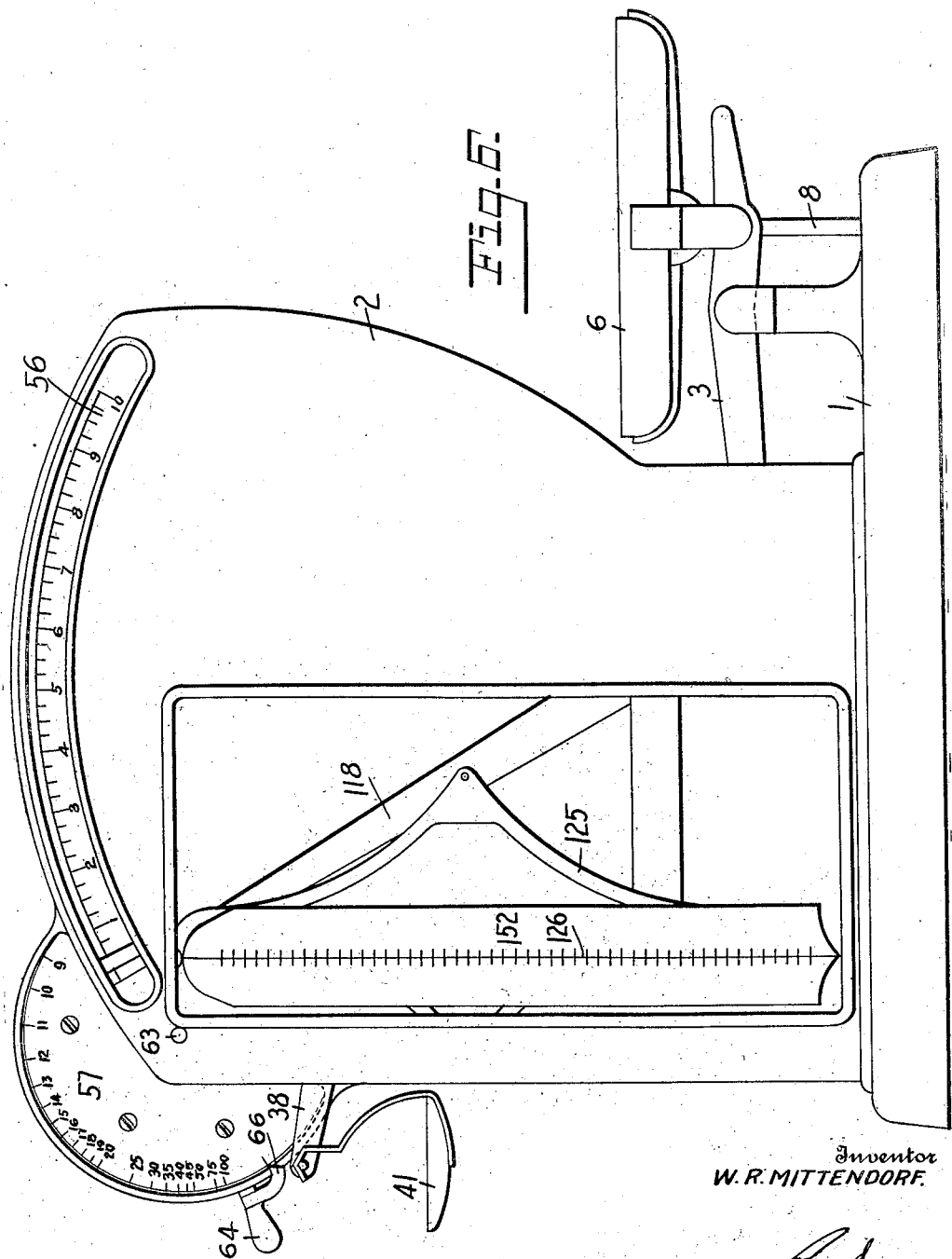

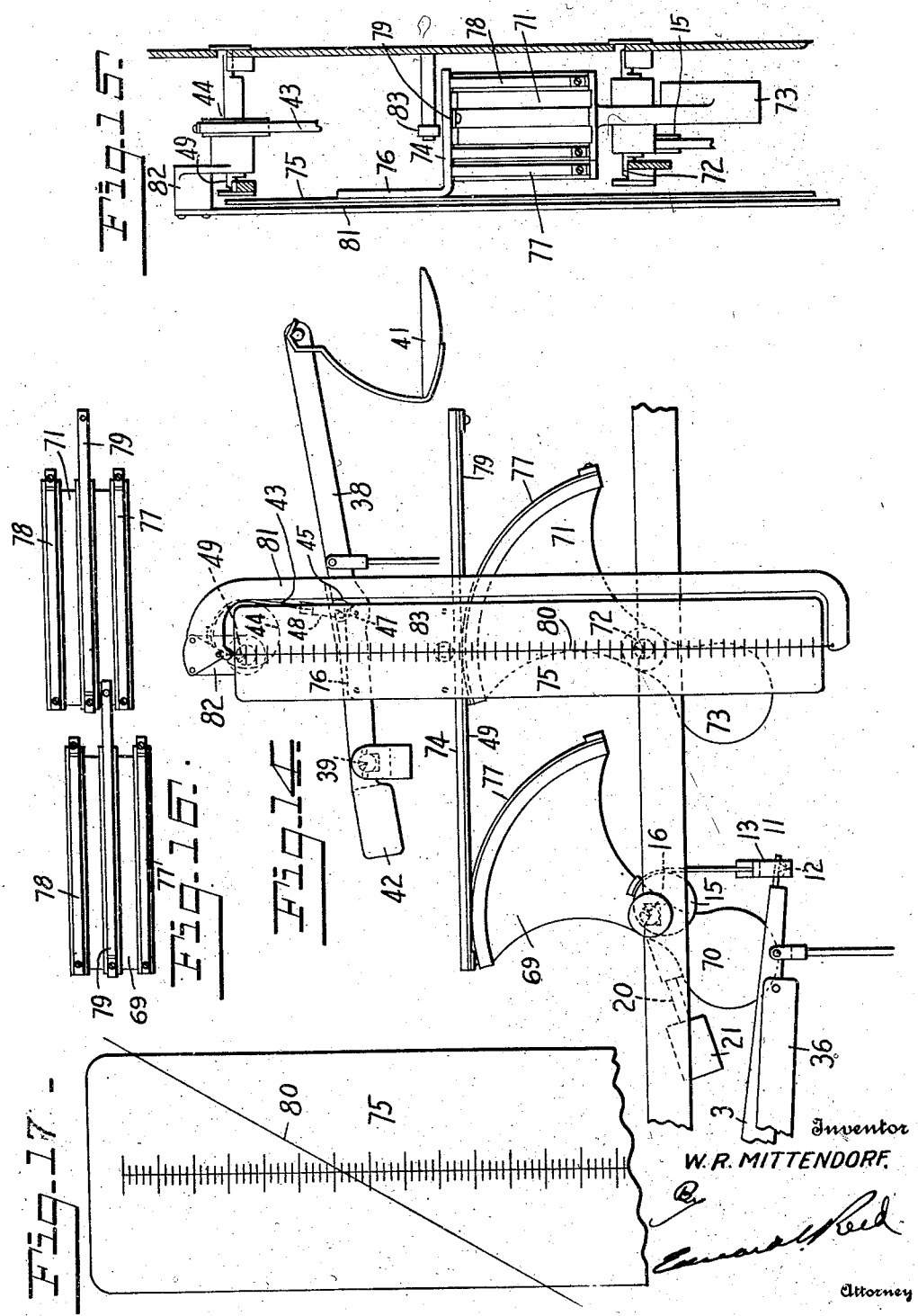

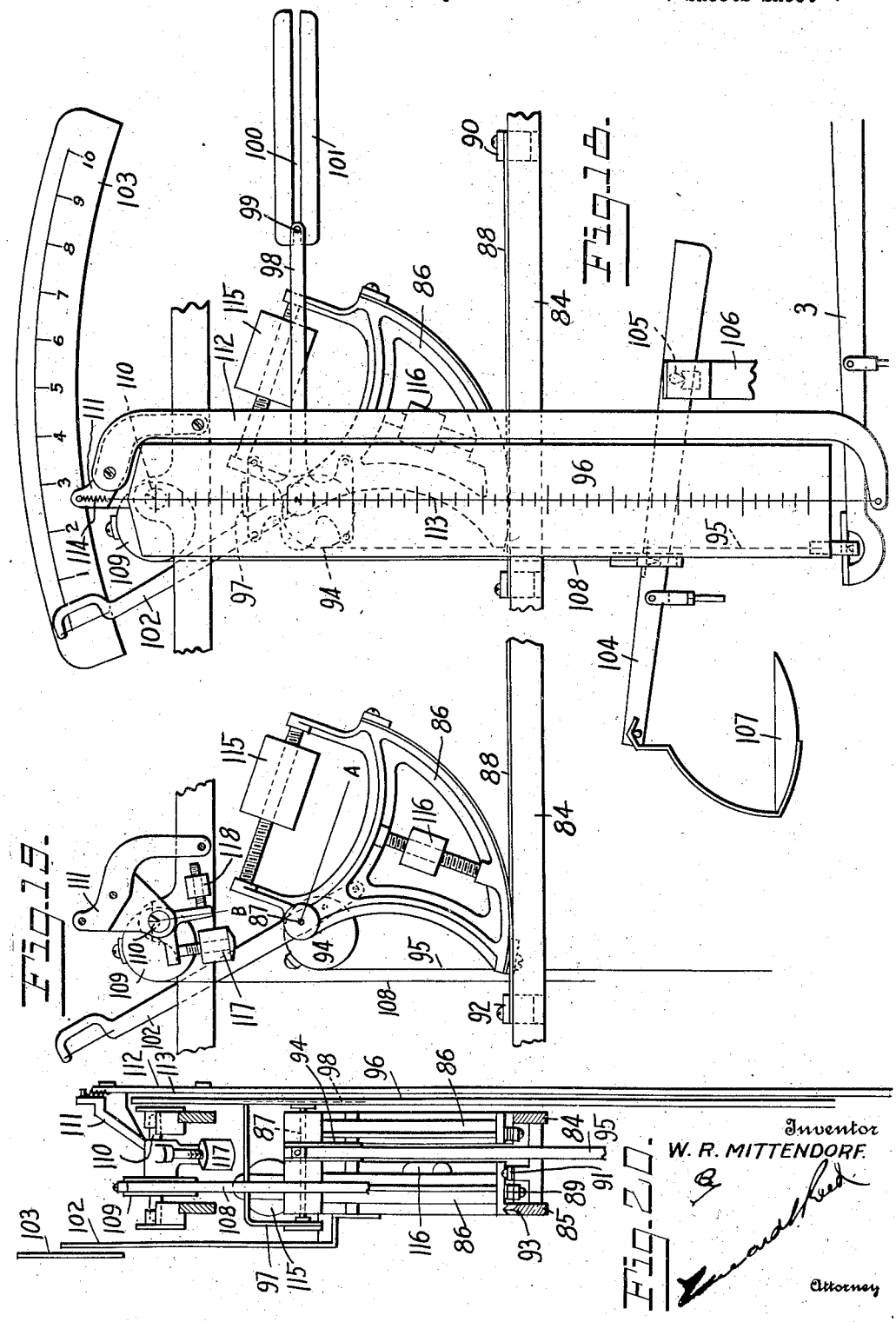

Patented Nov. 22, 1927.

1,650,224

UNITED STATES PATENT OFFICE.

WILLIAM R. MITTENDORF, OF CINCINNATI, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

COMPUTING SCALE.

Application filed September 23, 1922. Serial No. 590,085.

This invention relates to computing scales and one object of the invention is to provide a computing scale which will be fully automatic in its action so as not to require any mechanical manipulation on the part of the operator, other than the placing of the proper unit in the unit pan, when the number of articles in a mass is to be determined, or the adjustment of a price per pound indicator when the money value of a given commodity is to be computed.

A further object of the invention is to provide such a scale which can be used to determine the number of parts in a lot of unknown quantity, as well as to make up lots or parts of some certain predetermined quantity, with the capacity of the scale.

A further object of the invention is to provide a scale which will count parts of any odd unit of weight within its capacity and indicate the number of parts in the lot without in any manner changing the mechanical multiplication of leverage which exists in the scale.

A further object of the invention is to provide a counting scale which will indicate the number of parts in the lot and the weight of the load simultaneously.

A further object of the invention is to provide a scale by means of which the money value of a commodity may be determined at any price per pound within the price range of the scale by the use of a single series of money value graduations; and to obtain the computation automatically.

A further object of the invention is to provide a scale which will indicate the money value of a commodity and the weight of the commodity simultaneously.

A further object of the invention is to provide a scale having a relatively wide range and a large assortment of prices per pound and which will be of such a construction that the assortment of prices per pound can be readily changed without in any manner influencing the balance or correct operation of the scale.

A further object of the invention is to provide a scale which can be used either as a counting scale to determine the number of articles in a lot or as a price scale to determine the value of a commodity at a given price per pound.

A further object of the invention is to provide a computing scale of this character which will be simple in its construction and accurate in its operation.

Other objects of the invention will appear as it is described in detail.

Figure 2:
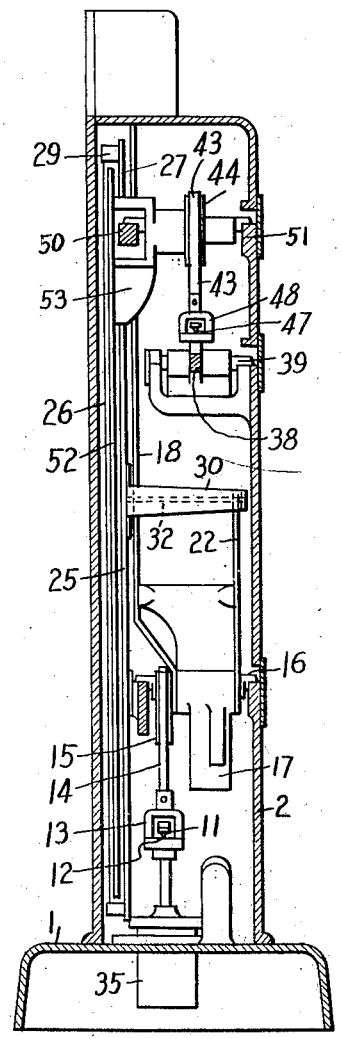

In the accompanying drawings Fig. 1 is a front elevation, with the casing in section, of a counting scale embodying my invention; Fig. 2 is a vertical section taken on the line 2—2 of Fig. 1; Fig. 3 is a detail view of a chart of such a counting scale; Fig. 4 is a detail view of a portion of the chart showing the same in its adjusted position; Fig. 5 is a front elevation, with the casing in section, of a combined counting and money value scale embodying my invention; Fig. 6 is a rear elevation of such a scale; Fig. 7 is a sectional view taken on the line 7—7 of Fig. 5; Fig. 8 is a detail view of a portion of the chart showing the same in its adjusted position; Fig. 9 is a section taken on the line 9—9 of Fig. 5; Fig. 10 is a section taken on the line 10—10 of Fig. 5; Fig. 11 is a plan view, partly in section, of the chart adjusting device shown in Fig. 5; Fig. 12 is a side elevation of the same; Fig. 13 is a detail view of the cam for adjusting the chart and its actuating segment; Fig. 14 is a front elevation of a modified form of the invention; Fig. 15 is a sectional view showing the mechanism of Fig. 14 in end elevation; Fig. 16 is a plan view of the segments of Fig. 14; Fig. 17 is a detail view of portions of the indicating devices of Fig. 14; showing the same in their adjusted positions; Fig. 18 is a front elevation, showing a further modification of the invention; Fig. 19 is a similar view with the indicating devices removed; and Fig. 20 is an end elevation of the mechanism shown in Fig. 18.

In carrying out my invention I have provided a computing device consisting of two indicating members, one of which is in the form of an elongated chart having a series of graduations extending lengthwise thereof and the other of which is in the form of a long thin indicating member, such as a wire, which is mounted independently of the chart. These indicating members are, in the present instance, so arranged that they will normally occupy positions substantially parallel one with the other, preferably with the wire in front of the chart and registering with the center line thereof. One of the indicating members is mounted for transverse movement toward and from its normal position and this movement is preferably imparted thereto by operatively connecting the same with a load balance. The other indicating member is movable into a position in which it will intersect the first mentioned indicating member so that the wire will indicate a certain graduation on the chart, which represents the result of the computation which has been made. The last mentioned indicating member is preferably pivotally mounted and swinging movement may be imparted thereto by connecting it with a unit balance when the scale is to be used as a counting scale or by connecting it with an adjustable price per pound indicating device when the scale is to be used as a money value computing scale. The load balance and the unit balance, or price per pound setting device, are entirely separate one from the other and there is no connection whatever between the indicating members.

The mechanism of the scale may be arranged in various ways and may take various forms and in the present drawings I have shown several embodiments thereof, but it will be understood that these have been chosen for the purpose of illustration only.

In one form of my invention I have provided two normally separate weighing mechanisms, or balances, having associated therewith means for causing the movements thereof to cooperate to indicate, on a computing device, the ratio between the loads on the two balances. The particular embodiment of the device shown in Figs. 1 to 4 comprises a counting scale only and may be used to determine the number of articles in a given mass of articles or to count out a given number of articles of a given character. As here shown, the scale comprises a base 1 having mounted thereon an upright casing, or housing, 2 and the mechanism of the scale is mounted upon this base and arranged within the housing. The scale comprises two separate and distinct balances, the larger of which constitutes a load balance and comprises a main lever 3 pivotally supported at 4 on upright standards 5 carried by the base 1. Supported by this main lever is a load receiving platform, or pan, 6 which is here shown as mounted in a suitable holder 7 pivotally supported on the lever 3 on knife edge bearings. The load platform is maintained in its upright position by means of a stem 8 depending from the holder 7 through the top of the base 1 and connected by a link 9 to a stationary stem 10 depending from the top wall of the base. The longer arm of the main lever 3 is operatively connected with one of the indicating devices and as here shown this end of the lever is provided with a nose iron 11 having a needle point 12 engaging in a socket in a stirrup 13, which is connected by a strap, or ribbon, 14 with a cam 15. This cam is rigidly, but adjustably, secured to a shaft, or pivot bar, 16 which is supported at its ends in bearings carried by the casing 2. Rigidly secured to the shaft 16 is a member 17 having connected therewith a weight indicator, or pointer, 18, the end of which travels over a chart 19 graduated in pounds and ounces, the member 17 serving as a counter weight for the pointer. Also connected with the shaft or pivot bar 16, preferably through the medium of the member 14, is a pendulum rod 20 on which is mounted the usual pendulum 21. Preferably a pendulum of the reversed type is used, and as here shown the pendulum is held normally in its elevated position by the weight of the lever 3 and when the end of the lever is raised by a load on the platform 6 the pendulum will move downwardly and actuate the indicating members connected therewith, the movement of the pendulum being in direct proportion to the weight of load. Pivotally mounted on the axis of the pivot bar 16 and preferably rigidly connected with the supporting member 17 is an arm 22 and pivotally mounted in the casing 2 in line with the axis of the arm 22 is a second arm 23 arranged parallel with and of equal length with the arm 22, the arm 23 being preferably yoke shaped, and being counterbalanced, as shown at 24. The upper ends of the two arms, 22 and 23, are connected one to the other by a link 25 which is also pivotally connected with the weight indicator 18, which extends parallel with the arm 22 and moves about a common axis therewith. This link carries one of the two indicating members constituting the computing device of the scale. In the present instance, this indicating member is in the form of a wire 26 supported in a vertical position. As here shown, the link 25 is in the form of a diamond shaped structure, having its upper and lower ends extended to form arms 27 and 28 with which the respective ends of the wire are connected by means of studs 29. It will be noted that the movement will be imparted to the weight indicator 18 and to the arms 22 and 23 by the pendulum 21 when a load has been placed in the pan 6 so as to raise the end of the lever 3, and thus permit the pendulum to move downwardly. The movement thus imparted to the weight indicator 18 and the arm 22 will move the link and the indicator wire 26 carried thereby transversely to the length of the wire, the wire being maintained at all times in a true vertical position. In order that the link 25 and the indicator wire 26 may be maintained in their proper vertical planes during their transverse movement the pivotal connections between this link and the arms 18, 22 and 23 are arranged to have a wide spread of bearing, which may be accomplished by rigidly securing to the link brackets 30 to which the arms are attached. Antifriction side contact points are provided for the pivotal connections between the link and its supporting arms in the form of small conical headed bushings 31 inserted in the link and the arms respectively. Pivot pins 32 and 33 pass through these bushings and form bearings for the link. If desired, the same type of side contact bearings may be used between the arm 23 and the casing 2 at the fulcrum point of the arm 23, at which point the pin 34 forms the bearing.

Preferably, the main lever 3 of the load balance is provided with a dash pot 35 of the usual construction and arrangement. I have also shown this main lever as having connected therewith a tare beam 36 on which is mounted a tare weight 37 which serves to counterbalance the weight of any receptacle which may be placed upon the load platform or pan 6.

The cam 15 is so shaped that the horizontal movement of the indicating wire 26 will be evenly graduated from zero to the capacity of the scale. In other words, the successive units of weight on the platform 6 will move the indicating member equal horizontal distances, this being essential to the proper operation of the counting scale. As the movement of the indicating member 26 is substantially parallel to a horizontal plane it will be apparent that the evenly graduated movements thereof will produce uneven movements of the weight indicator, or pointer, 18, the point of which moves in an arc, and to compensate for this movement graduations on the weight chart 19 are uneven.

As has been stated, the scale is also provided with a second balance which, in the present form of the scale, constitutes a unit balance and comprises a lever 38 pivotally mounted at 39 in suitable bearings formed in a bracket 40 carried by the casing 2. A unit receptacle, or pan, 41, is pivotally connected with the outer end, or nose, of the lever 38 and the lever 38 is counterbalanced in the usual manner by a weight 42. The lever 38 has connected therewith between its fulcrum point 39 and the point of connection with the unit pan 41, a strap, or ribbon 43, the other end of which is connected with a cam 44. The strap 43 may be connected with the lever 38 in any suitable manner, but, as here shown, the lever is provided with a recess 45 bridged by a bar 46 having a needle point 47 which engages the socket in a stirrup 48 secured to the strap 43. The cam 44 is rigidly but adjustably secured to a shaft, or pivot bar, 49 supported at one end in a bearing 50 carried by the casing 2 and at the other end in a bracket 51 secured to the casing. Operatively connected with the unit balance lever 38 is the second indicating member, or chart, 52 which is here shown as a long flat blade provided with a longitudinally extending series of graduations arranged along a central line and numbered. Preferably this chart is operatively connected with the lever 38 by rigidly attaching the same at its upper end to a member 53 which in turn is rigidly secured to the shaft, or pivot bar, 49. It will be apparent that when a unit is placed in the unit receptacle 41 the lever 38 and cam 44 will be actuated, thus rocking the chart 52 about the axis of the pivot bar 49 and moving the same into a position extending obliquely to the vertical line of the indicator wire 26 and in which position it will intersect the wire 26, if the two indicating members are in proper relation one to the other. It will be noted that in the present instance the chart, or blade, 52 serves as a pendulum to counterbalance the weight of the unit in the pan 41, but this is not an essential part of the invention and the unit in the pan may be counterbalanced in any suitable manner, and when the chart does not serve as a pendulum it will serve merely as an agent to carry the graduations and numerals. Also it will be noted that the lever 38 is provided with a dash pot 54 of the usual construction.

This apparatus may be utilized for determining the number of articles in a lot, or mass, of articles of uniform weight, or for counting out a specified number of such articles. When the load balance and the unit balance are in their normal, or zero, positions, that is, when both the load platform 6 and the unit pan 41 are empty, the indicator wire 26 will extend parallel with the center line of the indicator chart 22 and preferably will lie directly in front of that line. To determine the number of articles in a mass of articles the mass is placed upon the load platform 6, thus moving the indicator wire 26, transversely to its length a distance corresponding to the weight of the mass, provided the mass is within the capacity of the scale, which in the present instance is ten pounds. A single article, or unit, of like kind is then placed in the unit pan 41 which will result in the chart 52 being moved to an inclined position, this movement being proportionate to the weight of the article. If the weight of the unit relatively to the weight of the mass is sufficient to move the chart into such a position that the center line thereon will intersect the wire, the graduation at the point of intersection will represent the result of the computation, that is, the number of articles on the scale. In the present instance, this indication will represent the total number of articles on the scale, including those on the load platform and the one or more in the unit pan. To accomplish this, the pivotal point of the indicator chart 52 is arranged on an axis coincident with the first graduation from zero thereon, and thus the intersection of the indicator wire 26 with the center line of the chart will always register one graduation plus, which automatically allows for the part or parts in the unit pan. It will be noted that the indicator chart is provided with a plurality of vertical series of numerals corresponding to the graduations along the center line thereof. One series of numerals, the one marked under the heading "1", corresponds to the number of graduations when a single unit is in the pan 41 this series of numerals will represent the number of articles on the load platform. In the present instance, there are five other series of numerals arranged in such relation to the graduations that they will represent multiples of the corresponding numerals in the first mentioned series. As here shown, these other series of numerals are numbered 2, 5, 10, 20 and 40 and these numbers represent the number of articles on the load platform necessary to move the wire the distance of one graduation, on the chart when units composed of 2, 5, 10, 20 or 40 parts respectively are in the pan 41. As has been stated, if a unit consisting of one article when placed in the unit pan will move the chart into a position in which it will intersect the wire the numeral in series 1 corresponding to the graduation intersected by the wire will represent the number of articles on the scale. If, however, a single article does not move the chart far enough to intersect the wire as would frequently be the case where small articles were being counted in relatively large bulk an additional number of articles are placed in the unit pan, in the present instance either 2, 5, 10, 20 or 40 articles, and the reading of the chart is taken in that series of numerals corresponding to the number of units or articles in the unit pan. Consequently, to determine the number of articles in a mass the operator has only to place the mass of articles on the load platform and then place in the unit pan a sufficient number of articles to cause the center line of the chart to intersect the wire and then take the reading from the chart in that series of numerals corresponding to the number of articles in the unit pan.

In order to count out a certain specified number of articles one or more articles are placed in the units pan and then additional articles are placed on the load platform until the wire is moved to such a position that it will intersect the graduation representing the number of articles desired. For example, if it is desired to count out one thousand articles it will be apparent from an examination of the chart that the number 5 column thereon would have to be used because neither column 1, nor column 2 registers as high as one thousand. The operator would, therefore, place five articles in the unit pan and then place the articles to be counted on the load platform until the indicating wire moved over to such a position that the wire would intersect the center line at that graduation represented by the numeral 1000 in the No. 5 column. He would then have 995 articles on the load platform and 5 in the unit pan, making a total of 1000 articles on the scale. Consequently, the correct computation of the number of articles on the scale requires no calculation on the part of the operator and no manipulation of the mechanism of the scale, other than the placing of the necessary unit in the unit pan and the placing of the mass of articles on the load platform. When this has been done the computation is automatically effected and it is only necessary to take the reading from the chart.

The same principle here involved can be utilized for computing money values as well as for counting purposes. The money value computing feature may be embodied in a scale designed for computing money values only and having no counting operation, but in the present instance I have, for the purpose of illustration, shown the money value computing feature as combined with the counting feature so that the scale may be used either to compute the number of articles on the scale or to compute the money value of a commodity on the load platform at a selected price per pound. This combined scale embodies all the mechanism heretofore described and in addition thereto has means for controlling the movement of the chart according to the price per pound. This scale may be so constructed that the weight of the commodity on the load platform, the price per pound at which the value is being computed, and the result of the computation will be visible both to the customer and to the salesman. To this end the scale is provided not only with the weight chart 19 on the front thereof, that is, the side adjacent to the salesman, but also with a weight chart 56 on the rear side of the casing 2 in which position it may be read by the customer. A third chart 57 graduated according to the price per pound is also provided and carries corresponding graduations on both sides thereof. Mounted for movement about the axis 49 of the cam 44 is a toothed segment 58. This segment is mounted independently of the pivot bar of the cam and to this end it is journaled in a bracket 59, depending from the top of the casing and the pivot bar extends through the hub of the segment, the axis of the pivot bar being coincident with the axis of the toothed segment. The segment 58 is held against axial displacement by the supporting bracket 59 which has bearing in a groove 61 in the hub of the segment. Meshing with the segment 58 is a mutilated pinion, or segment, 62 carried by a shaft 63 journaled in the casing, 2, and having connected therewith an operating member 64 which in the present instance is in the form of a handle provided with pointers 65 and 66 traveling over the graduations on the respective sides of the price per pound chart 57. The operating member, or indicator, 64 may be held in adjusted positions in any suitable manner, but as here shown, I have confined a spring 67 between a collar 68 on the shaft 63 and the wall of the casing and this spring produces sufficient frictional contact to retain the parts in their adjusted positions. It will be noted that the segment 58 is provided with an offset portion, or shoulder, 61 arranged in line with a pin 60 carried by the cam 44 of the unit balance mechanism. The arrangement of the shoulder and the pin 60 with relation to the operating member or indicator 64 is such that when this indicator is moved from its normal position, as shown in Fig. 5, the toothed segment 58 will be moved into engagement with the pin 62 and the cam 44 will be rotated in the same direction that it would be rotated if an article had been placed in the unit pan 41, thereby carrying the indicator chart 52 into its inclined position and causing it to intersect the indicator wire 26. The position of the chart will, of course, correspond exactly to the position of the price per pound indicator 64—65. When the commodity, the value of which is to be computed, is placed upon the platform the wire 26 will be moved transversely a distance corresponding to the weight of the commodity and the graduation on the chart which is intersected by the wire will represent the value of the commodity on the load platform. If the value is computed in units of one cent the number 1 series of numerals on the chart 52 may be utilized as value indications or, if desired, a separate series of value indications may be applied to the chart, the value indications being preferably in a different color from the counting indications so as to avoid confusion and facilitate a quick reading of the chart. For example, if said price per pound indicator is set at the numeral 30 the chart will be moved to such a position that one pound on the load platform will cause the indicator wire 26 to intersect the center line of the chart 52 at the 30th graduation from zero; two pounds, at the 60th graduation, etc. It will be apparent that when the price indicator, or price per pound setting device, 64 is adjusted the movement of the cam 44 will permit the lever 38 of the unit balance to move downwardly under the weight of the unit pan but this is immaterial because the unit pan is not in use and its position does not affect the operation of the price computing devices. When the price per pound setting handle is in its normal position, as shown in Fig. 5, it will be obvious that an article placed in the unit pan 41 will actuate the unit balance mechanism independently of the price per pound mechanism and the counting will be effected in the same manner as if the price per pound mechanism were not present. It will be apparent that in this particular form of the device, the pivotal point of the indicator chart 52 must be arranged on an axis coincident with the zero graduation on the chart in order that the money values will be properly computed. Therefore the idea of automatically counting the part or parts in the unit pan during the counting operations does not apply in this instance.

While the chart 57 and the indicator 64—65 are here shown for the purpose of setting the indicator chart 52 for price per pound computations, it will be obvious that a similar chart and indicator may be used for setting the indicator chart according to various units of computation. For example, the operator of a counting scale is sometimes called upon to count at frequent intervals articles of the same kind. If these articles are so small that it is desirable to place a relatively large number of the same on the unit receptacle in order to move the indicator chart to a position in which a satisfactory reading may be taken, it is necessary to count out this number of parts onto the unit receptacle each time articles of this kind are to be counted. This requires time and there is always a possibility of an error in the count which would be so multiplied as to cause a material error in the computation. Under these circumstances the chart 57 instead of being provided with price per pound graduations may be provided with a marking or graduation to indicate the position of the indicator chart for this particular unit. Thus when the operator is called upon to count articles of this kind it is only necessary to set the indicator 64—65 on this mark and the indicator chart will be moved to the same position that it would have been moved by the proper number of articles on the unit receptacle. Of course the chart may be provided with any suitable number of marks or graduations to indicate the unit position for articles of various kinds and these markings may be given index numbers so that they can be readily identified. A single graduation may represent the unit for a single class of articles or for several classes of articles. For example, if the unit of one class of articles consists of forty of such articles, the total weight of which is one ounce, and the unit of another class of articles comprises fifty such articles the weight of which is also one ounce, the indicator 64—65 would be set to the same position on the chart 57. In this way quick accurate setting of the indicator chart may be had without the necessity of counting out the number of articles required for the unit.

Preferably the weight and price per pound indications are visible to the customer as well as to the salesman and, if desired, the result of the computation may also be made visible to the customer. To accomplish this it is only necessary to duplicate the computing indicators on the customer's side of the machine. In the combined form of the scale I have shown this duplication of the indicating members, a second chart 152 being mounted on the pivot bar 49 and arranged adjacent to the customer's side of the machine. A second link 125 is interposed between the yoke shaped arms 22 and 23 and provided with an indicator wire 126. Consequently the movements of the two computing indicating members will correspond exactly to the movement of the indicating members 52 and 26 and like computations will be indicated on both sides of the scale. The only change necessary in the mechanism to provide these duplicate indicators is to so mount the bracket 127, (Fig. 7) on which the pivot bar 39 of the unit balance lever 38 is mounted, and the pivot bar 49, which carries the charts 52 and 152, that the link 125 and chart 152 may extend between the same and the adjacent side wall of the casing, it being understood, of course, that the side walls of the casing are provided with sight openings, preferably closed by glass, through which the positions of the indicating members may be seen.

In both forms of the device above described, the chart 52 has been shown as the indicating member which is tilted by the unit balance or by the price setting device and the indicator wire has been shown as actuated by the load balance. It will be obvious, however, that as far as the operation of the scale is concerned, it is immaterial which indicating member is connected with the load balance and which is connected with the unit balance or the price per pound setting device, but a wider range of operation can be had by connecting the chart with the load balance. In Figs. 14 to 17 I have shown a modified form of load actuated mechanism for operating the indicating member which is connected with the load balance, and in these figures I have shown the chart as carried by this mechanism and moved transversely thereby. As shown in Fig. 14 the main lever 3 of the load balance is connected by the stirrup 13 and the strap 14 with the cam 15 and this cam is mounted on the pivot bar, or shaft, 16, in the manner heretofore described. Instead of providing the link 25 and connecting the same with the shaft 16 by the arm 22 I have, in this form of the device, mounted on the shaft 16 a segment 69 which is counter weighted at 70. A corresponding segment 71 is pivotally mounted on the casing 2, as shown at 72, on an axis parallel with the axis of the shaft 16, and is counter weighted, as shown at 73. These segments are connected one to the other by a plate, or bar, 74 to which the indicator chart 75 is secured. In the present instance, the plate 74 has an upturned portion 76 to which the chart is riveted. The supporting plate, or bar, 74 for the chart 75 is maintained at all times in such a position as to support the chart in a true vertical position and to move the same transversely in that position. As here shown, each segment, 69 and 71, is connected with the plate 74 by means of ribbons, or straps. Each segment has secured to the right hand end thereof, as shown in Figs. 14 and 16, straps 77 and 78 the opposite ends of which are secured to the plate, or bar, 74, adjacent to the left hand ends of the respective segments, the plate or bar resting upon the segments. A third strap 79 is secured to each segment near the left hand end thereof and in the present instance between the straps 77 and 78, and these third straps are connected at their right hand ends with the plate 74, adjacent to the right hand ends of the respective segments. It will be apparent, therefore, that when a load is placed on the load platform the segments 69 and 71 will be actuated in the same manner that the arms 22 and 23 of Fig. 1 are actuated and that these segments will carry with them in their movement the plate 74 on which the chart 75 is mounted. The arrangement of the segments with relation to the plate 74 is such that the chart will not only be maintained in a vertical position but will be held against vertical movement so that the graduations thereon will always occupy a fixed horizontal position. The straps 77, 78 and 79 being drawn taut and forming a tight firm connection between the plate and the segments there will be no lost motion and the movement of the segments will be accurately transmitted to the chart. If desired, a stop, such as a roller 83, may be arranged above the plate 74 to positively hold the same against vertical movement. The other indicating member, or wire, 80 is mounted for movement by the unit balance into an inclined position in which it will intersect the center line of the chart. As here shown, a wire supporting member, or frame, 81 is carried by a bracket 82 rigidly secured to the pivot bar, or shaft, 49 of the unit balance mechanism, and, consequently, this wire is actuated in the same manner that the chart is actuated in the device of Fig. 1.

By means of this mechanism, with either arrangement of the indicating members shown in Figs. 1 to 17, I am enabled to utilize a single series of graduations to compute a result based on various units of computation, such as different prices per pound in determining money values or units of different weight in counting. This results from the fact that the significance of the graduations on the chart change with each change of the unit of computation, that is, the divisions of movement of the load-actuated indicating member, as established by the graduations on the chart, increase in distance as the weight of the unit increases, when counting, and decrease in distance as the price per pound increases, when computing money value. In other words, as the weight of the unit increases, the load-actuated indicating member moves a greater distance for each graduation on the chart and as the price per pound increases, the load-actuated indicating member moves a lesser distance for each graduation on the chart. For example, if, when the device is used as a counting scale, a unit weighing one ounce is placed in the unit pan, one pound in weight of such units on the load platform will move the load actuated indicating member such a distance as to cause the wire to intersect the center line of the chart at the sixteenth graduation, each graduation thus representing a single unit. If the unit weighing two ounces is placed in the unit receptacle one pound in weight of such units on the load platform will cause the load actuated indicating member to move the same distance but because of the altered position of the chart the wire will register with the eighth graduation thereon, thus indicating that there are eight articles on the load platform. Likewise, in computing money values if the price per pound indicator is set at ten cents a pound one pound on the load balance will cause the wire to intersect the center line of the chart at the tenth graduation, indicating ten cents. If the price per pound setting device is set at twenty cents a pound, one pound on the load balance will cause the wire to intersect the center line of the chart at the twentieth graduation. Thus in each instance the change in the unit of computation changes the significance of the value graduations on the chart, this being accomplished without in any manner changing or affecting the weighing mechanisms.

Further, it will be apparent that with this mechanism the changing of the unit of computation does not affect or in any wise displace any part of the weighing mechanism, and therefore, it is possible to simultaneously indicate both the result of the computation and the weight in pounds and ounces.

It will also be noted that because of the manner of changing the significance of the graduations on the computing chart I am enabled to mount the unit value, or price per pound, chart on a fixed, or dormant, part of the mechanism. Therefore, this unit value chart may be replaced at will by other unit value charts to change the assortment of value units, or for any other purpose, without in any manner affecting the operation of the weighing mechanisms.

In Figs. 18 to 20 I have shown another arrangement of the mechanism of Figs. 14 to 17. As there shown, the casing 2 is provided with two parallel horizontal bars 84 and 85 which support a segment 86 which constitutes in effect a pendulum segment. This segment may, if desired, be formed in two parts separated one from the other but rigidly connected through their axes to a common supporting member, such as a shaft 87. This segment has connected with one end thereof, the left hand end in Figs. 18 and 19 straps, or ribbons, 88 and 89 which are connected at their opposite ends to cross ties between the bars, or tracks, 84 and 85, as shown at 90. A third ribbon, or strap, 91 is connected at one end with the right hand end of the segment 86 and at its other end with a cross tie extending between the bars 84 and 85, as shown at 92. The straps, or ribbons, are drawn taut to hold the segment firmly in contact with the supporting bars as it rocks to and fro thereon. The upper surface of the bar 85 is flat, as is the corresponding part of the segment 86 which engages that bar. The upper edge of the bar 84, however, is beveled on its opposite sides and the adjacent portion of the segment 86 is provided with a V-shaped groove 93 to receive the beveled edge of the bar and thus hold the segment against crosswise displacement with relation to the bars. Rigidly mounted on the shaft 87 is a cam 94 which is connected by a strap, or ribbon 95 with the nose end of the main lever 3 of the load balance. The chart, which is shown at 96 is connected with the segment for movement therewith as the latter rocks on the bars 84 and 85 but is so mounted that it will be retained in an upright, or vertical, position in all positions of the segment. In the present instance, the shaft 87 which is arranged at the axis of the segment projects beyond the ends of the hub thereof and forms trunnion bearings for a yoke 97 to which the chart 96 is rigidly secured. In this manner the chart is pivotally supported from the axis of the segment but the greater portion of its weight is below that axis so that it will tend normally to hang in a vertical position. However, to prevent the chart from having an oscillating movement about its axis I have provided the yoke 97 with a guide arm 98 at the outer end of which is a pin 99 which travels in the slot 100 formed between two stationary bars 101, which are rigidly secured to the casing. Preferably the pin 99 is so arranged in the slot that when the chart is at rest in a true vertical position the pin will not touch either wall of the slot but will float between the two bars. The weight indicator 102 is also carried by the segment 86 and is so arranged that as movement is imparted to the segment the indicator will travel over the weight chart 103.

The unit balance mechanism consists of a main lever 104 pivotally mounted at 105 in bearings formed in a bracket 106 carried by the casing and having pivotally connected at its outer end a unit pan 107. A strap 108 is connected at its lower end with a lever 104 and at its upper end with a cam 109 rigidly but adjustably mounted upon a shaft, or pivot bar, 110 journaled in suitable bearings carried by the casing of the scale. Rigidly secured to the shaft, or pivot bar, 110 is an arm 111 on which is mounted supporting member 112 which carries a second indicating member, or wire, 113. It so supports the same that when the parts are in their normal position the wire will register with the center line of the chart 96. If desired, a spring 114 may be interposed between the wire and its point of connection with the supporting member 112 at one end thereof to hold the wire taut.

Preferably the segment 86, with its associated parts, exclusive of cam 94, is not counterbalanced around its axis, so that it will, in itself, serve in part as the counterbalance for the lever of the load balance, in lieu of the usual pendulum; in order words, it is desired to have the segment 86 and the parts attached to it serve as the pendulum counterbalance for the main lever 3, in which case the segment becomes in effect a pendulum. To this end, it is necessary to establish the center of gravity of the segment, and the parts attached to it, in proper relation to the axis of the segment, in order to get the right counterbalancing effect. This center of gravity must be established substantially along the line "A" as the counterbalancing action is that of a descending pendulum. It will be noted that practically all of the mass of the segment is on the lower left hand side of the said line; therefore, it becomes necessary to locate an offsetting mass on the upper right hand side of said line in order to position the center of gravity approximately on said line. This offsetting mass mainly is the weight 115 and the rod and arms which support it. However, in order that the center of gravity may be definitely located on the line "A" I provide a weight 116 which is adjustable toward and from said line. Not only must the center of gravity be established on the line "A" but it must be located at the proper distance from the axis of the segment. For that purpose, the weight 115 is made adjustable parallel with said line. Thus it will be seen that the adjustment of the weight 116 acts to distribute the weight of the whole mass equally on each side of the line "A" and that the adjustment of the weight 115 acts to locate the center of gravity of the whole mass at the proper distance from the axis without affecting the distribution of the mass on each side of said line. The arm 111 of the unit balance mechanism is provided with weights 117 and 118, the purpose of which is substantially the same as that of the weights 115 and 116, namely to cause the arm and the parts attached to it to become in effect a pendulum to counterbalance the load in the unit pan 107 through the lever 104. As the counterbalancing action of the arm 111 and the parts attached to it is that of a rising pendulum, the center of gravity of said counterbalance should be established substantially along the line "B".

The operation of this form of the device is substantially similar to that above described and it will be apparent that the load on the load platform causes the movement of the main lever 3 of the load balance and its counterbalancing segment 86, resulting in a transverse movement of the chart 96, this movement being in direct proportion to the load on the platform. When the unit of computation is placed in the pan 107 the lever 104 will be actuated and the wire supporting member 112 together with the indicating wire 113 will be moved about the axis of the pivot bar 110 a distance proportionate to the weight of the unit. The indicating members being thus brought into intersecting relation the number of parts in the load on the platform will be indicated by that graduation on the chart which is intersected by the indicating wire.

While I have shown and described certain embodiments of my invention I wish it to be understood that I do not desire to be limited to the details thereof as various modifications may occur to a person skilled in the art. For example I have shown the load balance as comprising a lever 3 of the first order, which is counterbalanced by a pendulum of the reverse type, and I have shown the unit balance as comprising a lever 38 of the second order, which is counterbalanced by a rising pendulum, in the present instance the chart 52. It will be obvious, however, that either lever may be of any suitable character and may be counterbalanced in any suitable manner, this being a matter of expediency and depending largely upon the design of the particular mechanism in which the invention is embodied. Further, the indicating members may be associated with the respective balances in any suitable manner. As here shown the indicating member 26 is mounted independently of the load balance and is operatively connected therewith in such a manner that it does not effect the balancing operation. The indicating member or chart 52 is so connected with the unit balance that it forms a pendulum therefor and in effect constitutes a part of the balance. Again it will be obvious that these are matters of expediency and that either indicating member may be a part of its balance or that both may be independent of their respective balances.

Having now fully described my invention what I claim as new and desire to secure by Letters Patent, is:

1. In a computing scale, a load balance, a unit balance separate from and operable independently of said load balance, and cooperating indicating members actuated by the respective balances and movable thereby into intersecting positions to effect a computation at the point of intersection.

2. In a computing scale, two elongated indicating members arranged normally in substantially parallel positions, one of said members being movable toward and from its normal position and the other of said members being movable into a position in which it will intersect the first mentioned member, means for adjusting one of said indicating members according to a unit of computation, and other means for adjusting the other indicating member.

3. In a computing scale, two elongated indicating members arranged normally in substantially parallel positions, one of said members being movable toward and from its normal position and the other of said members being movable to a position in which it will intersect the first mentioned member, a load balance comprising a lever which is operatively connected with one of said members, said member being mounted independently of said lever, and means separate from said load balance to position the other of said members according to a unit of computation.

4. In a computing scale, two elongated indicating members arranged normally in substantially parallel positions, one of said members being movable toward and from its normal position and the other of said members being movable into a position in which it will intersect the first mentioned member, a load controlled device operatively connected with one of said members, and a unit controlled device operatively connected with the other of said members.

5. In a computing scale, a chart having a series of graduations extending lengthwise thereof, an indicating member supported independently of said chart, one of said members being movable transversely toward and from its normal position and the other of said members being movable into a position to intersect said transversely movable member, a load balance comprising a lever which is connected with one of said members, said member being supported independently of said lever, and means for positioning the other of said members according to a unit of computation.

6. In a computing scale, a chart having a series of graduations extending lengthwise thereof, an indicating member supported independently of said chart, said chart and said indicating member being arranged normally in substantially parallel positions, one of said members being movable transversely toward and from its normal position, and the other of said members being movable into a position intersecting said transversely movable member, a load controlled device operatively connected with one of said members, and a unit controlled device operatively connected with the other of said members.

7. In a computing scale, a chart having a series of graduations extending lengthwise thereof, an indicating member supported independently of said chart, said chart and said indicating member being arranged normally in substantially parallel positions, one of said members being movable transversely toward and from its normal position, and the other of said members being movable into a position intersecting said transversely movable member, a load controlled device operatively connected with one of said members, a unit controlled device operatively connected with the other of said members, and means other than said unit controlled device to position said last mentioned member.

8. In a computing scale, a chart having a series of graduations extending lengthwise thereof, an indicating member supported independently of said chart, one of said members being movable transversely toward and from its normal position and the other of said members being movable into a position to intersect said transversely movable member, a load balance comprising a lever which is operatively connected with one of said members, a stationary chart, and means for adjusting the other of said members with relation to said stationary chart.

9. In a computing scale, a chart having a series of graduations extending lengthwise thereof, an indicating member supported independently of said chart, said chart and said indicating member being arranged normally in substantially parallel positions, one of said members being movable transversely toward and from its normal position, and the other of said members being movable into a position intersecting said transversely movable member, a load controlled device operatively connected with one of said members, a unit controlled device operatively connected with the other of said members, a stationary chart, and means other than said unit controlled device for adjusting said other member with relation to said stationary chart.

10. In a computing scale, a load controlled device, a weight indicating member connected with said load controlled device, a count indicating member also connected with said load controlled device, and movable thereby, a unit controlled device, and a second count indicating member operatively connected with said unit controlled device and adapted to be moved thereby into a position intersecting the first mentioned count indicating member.

11. In a computing scale, a load balance, a weight indicating member connected with said load balance, a count indicating member operatively connected with said load balance and movable relatively thereto, a second count indicating member mounted for movement into a position intersecting the first mentioned count indicating member, and means independent of said load balance for positioning said second count indicating member.

12. In a computing scale, a load controlled lever, two cooperating indicating members mounted for movement relatively one to the other, and so arranged that one of said indicating members may be caused to intersect the other indicating member, to effect a computation at the point of intersection, one of said indicating members being supported independently of said lever and operatively connected therewith, and means separate from said load controlled lever to actuate the other indicating member.

13. In a computing scale, a load controlled lever, two cooperating indicating members mounted for movement relatively one to the other and so arranged that one of said indicating members may be caused to intersect the other indicating member to effect a computation at the point of intersection, one of said indicating members being supported independently of said lever and actuated thereby, and a unit controlled device operatively connected with the other indicating member.

14. In a computing scale, a load controlled lever, two cooperating indicating members mounted for movement relatively one to the other and so arranged that one of said indicating members may be caused to intersect the other indicating member, an operative connection between one of said indicating members and said lever, a unit controlled device operatively connected with the other indicating member, and means other than said unit controlled device for actuating the last mentioned indicating member.

15. In a computing scale, a weight controlled device, a supporting device operatively connected with said weight controlled device, an indicating member carried by said supporting device, a second indicating member movable into a position in which it will intersect the first mentioned indicating member to effect a computation at the point of intersection, and means independent of said weight controlled device to position said second indicating member.

16. In a computing scale, a weight controlled device, a pivotally mounted supporting device operatively connected with said weight controlled device, an indicating member carried by said supporting device, a second indicating member movable into a position in which it will intersect the first mentioned indicating member to effect a computation at the point of intersection, and means independent of said weight controlled device to position said second indicating member.

17. In a computing scale, a load balance, a pair of pivoted arms arranged substantially parallel one with the other, one of said arms being operatively connected with said load balance, a connecting member pivotally connected with both of said arms, an indicating member carried by said connecting member and movable by the movement of said arms, a second indicating member movable into a cooperating position with relation to the first mentioned indicating member, and means independent of said load balance to position said second indicating member.

18. In a computing scale, a load balance, a pair of pivoted arms arranged substantially parallel one with the other, one of said arms being operatively connected with said load balance, a connecting member pivotally connecting both of said arms, an indicating member carried by said connecting member and movable by the movement of said arms, a second indicating member movable into a cooperating position with relation to the first mentioned indicating member, and a unit controlled device operatively connected with said second indicating member.

19. In a computing scale, a load balance, a pair of pivoted arms arranged substantially parallel one with the other, one of said arms being operatively connected with said load balance, a connecting member pivotally connected with both of said arms, an indicating member carried by said connecting member and movable by the movement of said arms, a second indicating member movable into a cooperating position with relation to the first mentioned indicating member, a price per pound chart, and a device adjustable with relation to said price per pound chart and operatively connected with said second indicating member.

20. In a computing scale, a load balance, a pair of pivoted arms arranged substantially parallel one with the other, one of said arms being operatively connected with said load balance, a connecting member pivotally connected with both of said arms, an indicating member carried by said connecting member and movable by the movement of said arms, a second indicating member movable into a cooperating position with relation to the first mentioned indicating member, a unit controlled device separate from said load balance and operable independently thereof, an operative connection between said unit controlled device and said second indicating member, a price per pound chart, and an actuating member adjustable with relation to said price per pound chart and operatively connected with said second indicating member, whereby said second indicating member may be positioned either by said unit controlled device or by said price per pound actuating device.

21. In a computing scale, a load balance, a pair of substantially parallel levers each pivotally mounted near one end, a link connecting said levers one to the other, an operative connection between one of said levers and said load balance, an indicating member carried by said link, a unit controlled device, and a second indicating member operatively connected with said unit controlled device and adapted to be moved into a position to intersect the indicating member carried by said link.

22. In a computing scale, a load balance, a pair of substantially parallel levers each pivotally mounted near one end, a link pivotally connected at its opposite ends with the respective levers and having parts extending above and below the line of said pivotal connection, a wire carried by said link and supported in a vertical position, a unit controlled device separate from said load balance, a chart pivotally supported near one end and arranged normally in a line parallel with said wire, and an operative connection between said chart and said unit controlled device whereby said chart may be moved into a position in which it will be intersected by said wire.

23. In a computing scale, a load balance, an indicating member operatively connected with said load balance, a second indicating member cooperating with the first mentioned indicating member, a unit controlled device operatively connected with said second indicating member, and a price per pound adjusting device operatively connected with said second indicating member, whereby said second indicating member may be actuated by either said unit controlled device or said price per pound adjusting device.

24. In a computing scale, a load balance, an indicating member operatively connected with said load balance, a pivot bar, a second indicating member connected with said pivot bar, a cam secured to said pivot bar, a unit receptacle connected with said cam, a price per pound chart, an adjusting device movable over said chart, and means actuated by said adjusting device to move said cam independently of said unit receptacle.

25. In a computing scale, a load balance, an indicating member operatively connected with said load balance, a pivot bar, a second indicating member connected with said pivot bar, a cam secured to said pivot bar, a unit receptacle connected with said cam, a segment mounted for movement about the axis of said pivot bar, said segment and said cam having parts adapted to be brought into engagement when said segment is moved in the direction in which said cam is moved by said unit receptacle, and means for actuating said segment.

26. In a computing scale, a load balance, an indicating member operatively connected with said load balance, a pivot bar, a second indicating member connected with said pivot bar, a cam secured to said pivot bar, a unit receptacle connected with said cam, a toothed segment mounted for rotation about the axis of said pivot bar, a pin carried by said cam and arranged in the path of said segment, a pinion meshing with said toothed segment, an operating handle connected with said pinion, and a price per pound chart over which said handle is adjusted.

27. In a computing scale, a load balance comprising a lever, an indicating member supported independently of said lever for transverse movement relatively thereto, a connection between said indicating member and said lever to cause said indicating member to be actuated by the load on said load balance, a second indicating member pivotally supported and movable into a position in which it will intersect the first mentioned indicating member to effect a computation at the point of intersection, and means independent of said load balance for actuating said second indicating member.

28. In a computing scale, a load balance comprising a lever, an indicating member supported independently of said lever for transverse movement relatively thereto, a connection between said indicating member and said lever to cause said indicating member to be actuated by the load on said load balance, a second indicating member pivotally supported and movable into a position in which it will intersect the first mentioned indicating member, a price per pound chart, and means for positioning said second indicating member with relation to said price per pound chart.

29. In a computing scale, a load balance, a unit controlled device separate from said load balance, a vertically arranged indicating member mounted for movement transversely to its length, an operative connection between said indicating member and said load balance, a second indicating member pivotally supported near one end and movable into a position in which it will intersect the first mentioned indicating member, and an operative connection between said second indicating member and said unit controlled device, one of said indicating members comprising a chart having a longitudinally arranged series of graduations thereon and a plurality of series of numerals associated with said graduations.

30. In a computing scale, a load controlled member, a counterbalance operatively connected with said load controlled member, a movable indicating member operatively connected with said counterbalance, and a second indicating member movable into any one of a plurality of positions intersecting the first mentioned indicating member to effect a computation at the point of intersection.

31. In a computing scale, a load balance comprising a shiftable counterbalance, a movable indicating member operatively connected with said counterbalance, a second indicating member movable into any one of a plurality of positions intersecting the first mentioned indicating member to effect a computation at the point of intersection, and means for adjusting said second indicating member according to a unit of computation.

32. In a computing scale, a load balance comprising a shiftable counterbalance, an indicating member operatively connected with said counterbalance, a unit controlled device, a second indicating member operatively connected with said unit controlled device and movable into a position to intersect the first mentioned indicating member and to effect a computation at the point of intersection.

33. In a scale, two separate load actuated weighing mechanisms, indicating devices controlled by the movements imparted to the respective weighing mechanisms by the loads thereon to compute the ratio between said loads, and means other than the load for causing the indicating device for the smaller capacity mechanism to cooperate with the movement of the indicating device for the larger capacity mechanism according to a unit of computation, to compute the value of the larger load.

34. In a scale, two cooperating indicating members, one of said indicating members comprising a chart having value graduations, load actuated weighing mechanism operatively connected with one of said indicating members, and an operable device independent of said load actuated mechanism for so positioning the other indicating member with relation to the first mentioned indicating member that the significance of the graduations on said chart may be varied.

35. In a scale, two cooperating indicating members, one of said indicating members comprising a chart having value graduations, load actuated weighing mechanism operatively connected with one of said indicating members, and a unit controlled device separate from said load actuated weighing mechanism and operatively connected with the other of said indicating members.

36. In a scale, two cooperating indicating members, one of said indicating members comprising a chart having value graduations, load actuated weighing mechanism operatively connected with one of said indicating members to move the same relatively thereto, and means independent of said load actuated weighing mechanism for moving the other indicating member to different positions in which it will intersect the first mentioned indicating member.

37. In a scale, a load actuated weighing mechanism comprising a lever, a chart having value graduations, and an indicating member cooperating with said chart, one of said parts being supported independently of said lever and operatively connected therewith and the other of said parts being movable independently of said weighing mechanism, and means for moving said other of said parts to different operative positions with relation to the first mentioned part to cause the significance of the graduations on the chart to be varied.

38. In a scale, a load actuated weighing mechanism, a chart having value graduations, and an indicating member cooperating with said chart, one of said parts being actuated by said weighing mechanism and the other of said parts being movable independently of said weighing mechanism, a unit controlled device, and means for actuating the other of said parts by said unit controlled device or independently thereof, whereby the significance of the graduations on the chart may be varied.

39. In a scale, a load actuated weighing mechanism comprising a lever, an indicating member supported independently of said lever and actuated thereby, a chart having a single series of value graduations and mounted for movement independently of said load actuated mechanism, and means for positioning said chart with relation to said indicating member to cause the significance of the graduations thereon to be varied.

40. In a scale, load actuated weighing mechanism, an indicating member actuated thereby, a chart cooperating with said indicating member and having value graduations and mounted for movement independently of said load actuated weighing mechanism, a unit controlled device, means for positioning said chart by said unit controlled device or independently thereof, whereby the significance of the graduations on the chart may be varied.

41. In a scale, load actuated weighing mechanism, an indicating member actuated thereby, a chart having value graduations, mounted for movement independently of said load actuated weighing mechanism and cooperating with said indicating member to indicate the result of a computation, a unit value chart, and an indicating device cooperating therewith and having means to establish the significance of the graduations on the first mentioned chart.

42. In a scale, load actuated weighing mechanism, a value indicating member actuated thereby, a second value indicating member mounted for movement independent of said load actuated weighing mechanism, means for positioning said second indicating member for cooperation with the first mentioned indicating member according to a unit of computation, and a chart supported independently of said weighing mechanism to indicate the value of the units of computation, whereby the nature and assortment of said units may be changed without affecting or displacing any member of the load actuated weighing mechanism.

43. In a scale, load actuated weighing mechanism, a value indicating member actuated thereby, a unit controlled device, a second value indicating member mounted for movement independent of said load actuated weighing mechanism, means for positioning said second indicating member for cooperation with the first mentioned indicating member according to a unit of computation, either by the movement of said unit controlled device or independent thereof, and a chart to indicate the value of the units of computation, said chart being supported on a dormant part of the mechanism whereby the nature and assortment of said units may be changed without affecting or displacing any member of said weighing mechanism or unit controlled device.

44. In a scale, two separate weighing mechanisms of different capacities, means for causing the movements imparted thereto by the respective loads to cooperate to compute the ratio between the loads, means other than the load for causing the movement of the smaller capacity mechanism to cooperate with the movement of the larger capacity mechanism according to a unit of computation to compute the value of the larger load, and means for indicating the weight of the larger load.

45. In a scale, load actuated weighing mechanism comprising a lever, cooperating indicating devices, one of said indicating devices comprising a chart having a single series of graduations and one of said indicating devices being supported independently of and actuated by said lever, and means comprising one of said indicating devices and operable independently of said weighing mechanism to change the significance of the graduations on said chart.

46. In a scale, a load actuated weighing mechanism comprising a lever, cooperating indicating devices, one of said indicating devices comprising a chart having a single series of value graduations the significance of which may be varied in accordance with a selected unit of computation, one of said indicating devices being supported independently of and actuated by said lever, and means comprising one of said indicating devices and operable independently of said weighing mechanism to establish said unit of computation.

47. In a scale, a load actuated weighing mechanism comprising a lever, cooperating indicating devices, one of said indicating devices being supported independently of and actuated by said lever and one of said indicating devices comprising a chart having a single series of graduations the significance of which may be varied in accordance with a selected unit of computation, means comprising one of said indicating devices for establishing said unit of computation, and means for changing the nature and assortment of said units without affecting or displacing any member of the weighing mechanism.

48. In a scale, load actuated weighing mechanism comprising a lever, cooperating indicating devices, one of said indicating devices comprising a chart having a single series of graduations, one of said indicating devices being actuated by said lever, means comprising the other of said indicating devices and operable independently of said weighing mechanism to change the significance of the graduations on said chart, and means for indicating the weight of the load.

49. In a scale, two indicating members movable into intersecting positions to effect a computation at the point of intersection, load actuated weighing mechanism comprising a counterbalance connected therewith, supported normally in an elevated position and adapted to move downwardly when a load is applied to said weighing mechanism, an operative connection between said counterbalance and one of said indicating members, and a unit controlled device connected to the other indicating member.

50. In a computing scale, a load balance, an indicating member mounted for transverse movement, a connection between said indicating member and said load balance, to cause said indicating member to be actuated by the load on said balance, a second indicating member pivotally supported and movable into a position in which it will intersect the first mentioned indicating member, a price per pound chart, and means for positioning said second indicating member with relation to said price per pound chart, said indicating members and said price per pound chart being provided in duplicate and arranged on opposite sides of said scale.

51. In a scale, a load balance, an indicating member operatively connected with said load balance, a second indicating member cooperating with the first mentioned indicating member to indicate the result of a computation, a price per pound chart arranged on each side of said scale, an adjusting device operatively connected with said second indicating member and movable over said price per pound chart, a weight indicating chart arranged on each side of said scale, and an indicating device movable over said weight charts, and means for actuating said weight indicating member simultaneously with the operation of the first mentioned indicating members.

52. In a computing scale, a load balance, an indicating member operatively connected with said load balance, a second indicating member cooperating with the first mentioned indicating member to indicate the result of a computation, said indicating members being provided in duplicate, on opposite sides of said machine, a price per pound chart arranged on each side of said machine, and an adjusting device for said second indicating member movable over said price per pound chart.

53. In a computing scale, two separately movable indicating members arranged to be moved into intersecting positions to effect a computation at the point of intersection, and separate weight controlled means for imparting movement to the respective indicating members.

54. In a computing scale, two separately movable indicating members arranged to be moved into intersecting positions, separate weight controlled means for imparting movement to the respective indicating members, and means other than said weight controlled means for actuating one of said indicating members.

55. In a scale, a weight actuated member, an oscillating structure mounted independently of and operatively connected with said member, an indicating member mounted on said structure and movable therewith, a second indicating member to cooperate with the first mentioned indicating member, and a unit controlled device operatively connected with said second indicating member.

56. In a scale, a weight actuated member, an oscillating structure mounted independently of and operatively connected with said member, an indicating member mounted on said structure and movable therewith, a second indicating member to cooperate with the first mentioned indicating member, a unit controlled device operatively connected with said second indicating member, and means other than said unit controlled device for actuating said second indicating member.

57. In a computing scale, two separate independently operable weight controlled members, cooperating indicating members, means controlled respectively by the first mentioned members to cause said indicating members to be moved into intersecting positions to effect a computation at the point of intersection, and means for indicating the weight of the load which actuates one of said weight controlled members.

58. In a computing scale, a weight actuated member, an indicating member connected with said weight actuated member, and movable thereby, a second indicating member mounted for movement independently of said weight actuated member into any one of a plurality of operative positions intersecting the first mentioned indicating member to effect a computation at the point of intersection, and actuating mechanism to position said second indicating member according to a unit of computation.

59. In a computing scale, a weight actuated member, an indicating member connected with said weight actuated member and movable thereby, a second weight actuated member separate from and operable independently of the first mentioned weight actuated member, a second indicating member connected with said second weight actuated member and movable thereby into a position intersecting the first mentioned indicating member, a stationary chart, and means other than said second weight actuated member for adjusting said second indicating member with relation to said stationary chart.

60. In a computing scale, a weight actuated member, an indicating member connected with said weight actuated member and movable thereby, a second weight actuated member separate from and operable independently of the first mentioned weight actuated member, a second indicating member connected with said second weight actuated member and movable thereby into a position intersecting the first mentioned indicating member, a stationary chart, means other than said second weight actuated member for adjusting said second indicating member with relation to said stationary chart, and means for indicating the weight of the load which actuates one of said weight actuated members.

61. In a computing mechanism, an indicating member having a line extending longitudinally thereof, a series of graduations extending lengthwise of said line, and a second indicating member arranged normally in a position parallel with said line, one of said members being movable into a position to cause said second indicating member to intersect the line and the series of graduations on the first mentioned indicating member, to indicate at the point of intersection the result of a computation.

62. In a computing mechanism, an indicating member having a line extending longitudinally thereof, a series of graduations extending lengthwise of said line, and a second indicating member to cooperate with the first mentioned indicating member, the first mentioned member being movable transversely to its length and the other of said members being movable into a position to intersect the line and the series of graduations on the first mentioned indicating member, to indicate at the point of intersection the result of a computation.

63. In a computing mechanism, an indicating member having a center line extending longitudinally thereof, a series of graduations extending lengthwise of said center line, and a plurality of series of indications associated with said graduations to designate a plurality of different values for each graduation, and a second indicating member arranged normally in a position parallel with said center line of the first mentioned indicating member, one of said indicating members being movable into a position to cause said second indicating member to intersect the line and the series of graduations on the first mentioned indicating member, to indicate at the point of intersection the result of a computation.

64. In a computing scale, a load balance, a pair of corresponding movable indicating members arranged on opposite sides of said scale, connections between said indicating members and said load balance to cause said indicating members to be actuated in unison by the load on said balance, a second pair of corresponding indicating members pivotally supported on the opposite sides of said scale and movable into positions in which they will intersect the respective indicating members of the first mentioned pair to indicate the result of a computation simultaneously on both sides of said scale, and means for simultaneously actuating the indicating members of said second pair.

65. In a computing scale, a load balance, an indicating member operatively connected with said load balance, a second indicating member cooperating with the first mentioned indicating member to indicate the result of the computation, said indicating members being provided in duplicate, on opposite sides of said machine, and means for adjusting the last mentioned indicating members according to a unit of computation.

66. In a counting scale, a load balance comprising a lever, an indicating member mounted independently of said lever and operatively connected therewith, a second indicating member to cooperate with the first mentioned indicating member to effect a computation, one of said indicating members comprising a chart having a single series of graduations which are intersected by the other indicating member, means separate from and operable independently of said load balance to adjust said second indicating member according to a unit of computation so that the significance of the graduations on said chart may be varied.

67. In a scale, two separately movable indicating members cooperating to effect a single computation, one of said indicating members comprising a chart having a single series of graduations which are intersected by the other indicating member, load actuated weighing mechanism comprising a weight connected therewith to counterbalance the same, supported normally in an elevated position and adapted to move downwardly when a load is applied to said weighing mechanism, an operative connection between said counterbalancing weight and one of said indicating members, and means independent of said load weighing mechanism for moving the other indicating member to different operative positions with relation to the first mentioned indicating member.

68. In a scale, a weight actuated member, an oscillating structure mounted independently of and operatively connected with said member, an indicating member mounted on said structure and movable therewith, and a second indicating member movable relatively to the first mentioned indicating member and arranged to cooperate with said first mentioned indicating member, one of said indicating members comprising a chart having a single series of graduations which are intersected by the other indicating member.

69. In a computing scale, two separately movable indicating members arranged to be moved into intersecting positions to effect a computation at the point of intersection, one of said indicating members comprising a chart having a single series of graduations, each of said indicating members being movable into a plurality of operative positions with relation to the other indicating member, weight controlled means for actuating one of said indicating members, and means independent of said weight controlled means to actuate the other of said indicating members.

70. In a computing scale, two separately operable weight controlled mechanisms, indicating devices, and means controlled by the respective weight controlled mechanisms to move said indicating devices into intersecting positions to effect a computation based upon the relative movements of the weight controlled mechanisms.

71. In a computing scale, two separately operable weight controlled mechanisms, indicating devices, means controlled by the respective weight controlled mechanisms to move said indicating devices into intersecting positions to effect a computation based upon the relative movements of the weight controlled mechanisms, and means for indicating the weight of one of said loads.

72. In a scale, a balance, an oscillatable structure mounted independently of and operatively connected with said balance, an indicating member mounted on said structure and movable therewith, and a second indicating member, one of said indicating members comprising a chart having a single series of graduations, and the two indicating members being so arranged that one of them may be intersected by the other to indicate on said chart the result of a computation.

73. In a scale, a balance, a supporting member mounted independently of said balance, operatively connected therewith and adapted to be reciprocated thereby, an indicating member mounted on said supporting member for movement therewith, a second indicating member, one of said indicating members comprising a chart having a single series of graduations, and the two intersecting members being so arranged that one of them may be intersected by the other to indicate on said chart the result of the computation.

74. In a scale, a balance, a supporting device mounted independently of said balance and operatively connected therewith for operation thereby, an indicating member supported by said device and movable therewith, and a second indicating member, one of said indicating members comprising a chart having a single series of graduations, and the two indicating members being so arranged that one of them may be intersected by the other to indicate on said chart the result of the computation.

75. In a counting scale, a receptacle mounted for movement subject to the influence of a major load, a second receptacle mounted for movement subject to the influence of a minor load, two cooperating indicating members mounted for movement into intersecting positions, and means for separately connecting said indicating members with the respective receptacles to cause each of said indicating members to be actuated and controlled according to the weight of the load carried by that receptacle with which it is connected.

In testimony whereof, I affix my signature hereto.

WILLIAM R. MITTENDORF.